Aug. 17, 1965

H. D. ENGLISH 3,201,742

ELECTRIC CONNECTOR

Filed March 8, 1962

INVENTOR
HOWARD D. ENGLISH

BY J. Wesley Everett

ATTORNEY

United States Patent Office 3,201,742
Patented Aug. 17, 1965

3,201,742
ELECTRIC CONNECTOR
Howard D. English, Cockeysville, Md., assignor of one-half to Frederick A. Ramia, Baltimore, Md.
Filed Mar. 8, 1962, Ser. No. 178,333
1 Claim. (Cl. 339—58)

The present invention relates to electric connectors and is particularly constructed to connect a battery operated apparatus with a remote electric current supply, such as, one hundred seventeen volt 60 cycle alternating house current.

These apparatus usually have a special battery container for as many dry batteries as are necessary to operate the apparatus, which usually range from one to six batteries of the conventional type. These dry batteries furnish approximately 1.4 volts to a battery and are usually placed in series, if the apparatus requires more than a one battery for its operation.

These dry batteries will not hold up for a very long period when used to any great extent and it is with this thought in mind that the present device has been developed.

At the present time a large number of toys are being sold which are operated by dry batteries. This is more economical to the manufacturer because the cost of the battery is not included in the manufacturer's cost. Also the cost to furnish a transformer with the toy would be very expensive and a greater money outlay for the manufacturer. However, the buyer and user of the toy experiences substantial outlay in the continual purchase of dry batteries to operate the toy or any other battery-operated apparatus.

It is, therefore, the primary object of the present invention to be able to readily connect a combination transformer and rectifier, or as it is sometimes referred to in the trade a "power pack," to the toy or other apparatus through the battery box, whereby one of the battery cells is replaced by the improved connector and the remaining battery spaces filled in by elements adapted to connect the terminals in each of the cell spaces made in the form of a dummy cell.

While the primary object of the invention has been set forth, other objects, uses and advantages of the device will become more apparent as the nature of the invention is more fully disclosed by the accompanying drawings and the detailed description.

In the drawings.

In referring to the drawings like and similar reference characters are used to designate like and similar parts throughout the several views.

The electrical connector is shown being used in connection with a slide projector, but may be used with any other type apparatus operated by one or several cells. The connector may be used with either a stationary or movable apparatus. Of course, if used with a movable apparatus the lead-in cord must be of such length as to accommodate the movement of the apparatus.

The connector is primarily for use with toys, but it may be used in other types of apparatus which are normally battery operated.

Figure 2:
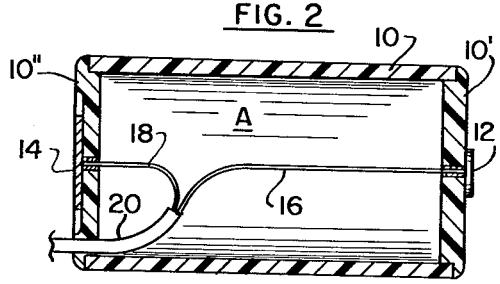
FIGURE 2 is a sectional view of one form of the connector showing two lead wires, one connected with each of the electrical contacts of the connector.

The electric connector is designated by the letter A, and is preferably provided with an insulated outer support or shell 10, 10' and 10", which may be constructed of a resin plastic material or any suitable material. One end is provided with an electric contact member 12 similar to the positive contact member found on one end of a dry battery. The other end of the shell is provided with an electric contact plate 14 positioned to take the place of the negative or bottom of the dry battery. In FIG. 2 there is attached to a contact member 12 a wire 16, and to contact plate 14 there is attached a wire 18. These two wires are carried through the insulated support or shell of the connector 10" in an insulated cable like member 20. These wires 16 and 18 are connected to a conventional combination transformer and rectifying unit 22 through companion wires (not shown) extending through the cable 24. Current is fed into the unit 22 by wires (not shown) extending through the cable 26 which leads to a conventional electric outlet plug 27 in the house electric wiring system to obtain a source of electric current outside the battery area. This type unit is generally referred to in the trade as a "power pack" and is so designed that its output may be controlled by the use of a series of contacts extending along the primary winding or secondary winding. The details of the power pack are not shown as its structure is well-known and it forms no part in the present invention.

Figure 3:
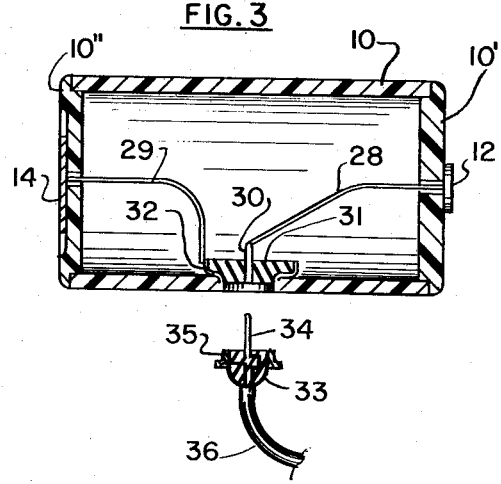
FIGURE 3 is a sectional view of a modified form of connector in which the connector is provided with a plug-in attachment whereby the lead-in wires may readily be attached or detached as the case may be.
Figure 5:
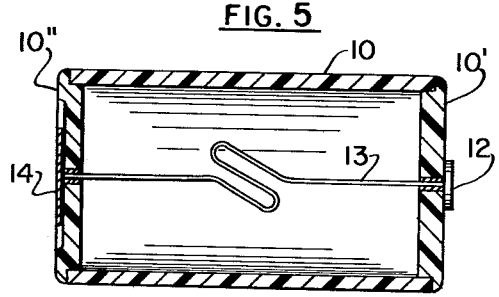
FIGURE 5 is a sectional view of a dummy cell, which is used with the connector when the apparatus is operated by more than one battery.

FIGURE 3 shows a modified form of connector. The shell 10, 10' and 10", the contact members 12 and 14 are the same as described for FIGURE 2, the difference being that a lead wire 28 is connected to contact 12 and to one terminal 30 of a socket 31 positioned in the side of the shell 10. Connected to the contact member 14 is a lead wire 29 connected to a second terminal or housing 32 of the socket. The socket 31 is positioned within the shell and does not extend beyond the outer surface of the shell. Adapted to connect to the socket 31 is a plug 33. The portion 34 of the plug is adapted to connect with the terminal 30 and the portion 35 is adapted to be connected to the housing 32. Connected to the member 34 and 35 of the plug 33 are separate wires (not shown) leading to the "power pack" 22 through the cable 36.

Figure 4:
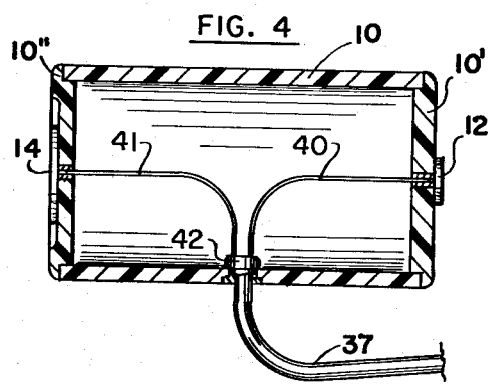
FIGURE 4 is a sectional view of the connector similar to that shown in FIGURE 3 showing the lead-in wires extending outwardly from the side of the contact supports.

In FIGURE 4 the connector is shown with the current supply wires 40 and 41 extending outwardly through the side of the shell 10 at 42 and into a cable 37 leading to the "power pack." The wires may either extend through the side or either end of the connector as illustrated in FIGURES 2 and 4.

There may be installed in the wiring of cable 20 or 24 a two pole double throw switch, which will reverse the polarity of the electric current and therefore reverse the operation of a movable toy or apparatus, such as reversing the direction of an electric motor. Likewise the direction of operation may also be changed by reversing the position of the battery.

While the electric current within the shell 10 is shown carried by wires such as 16 and 18 in FIGURE 2, the current may be carried by a sprayed or printed circuit if so desired.

Figure 1:
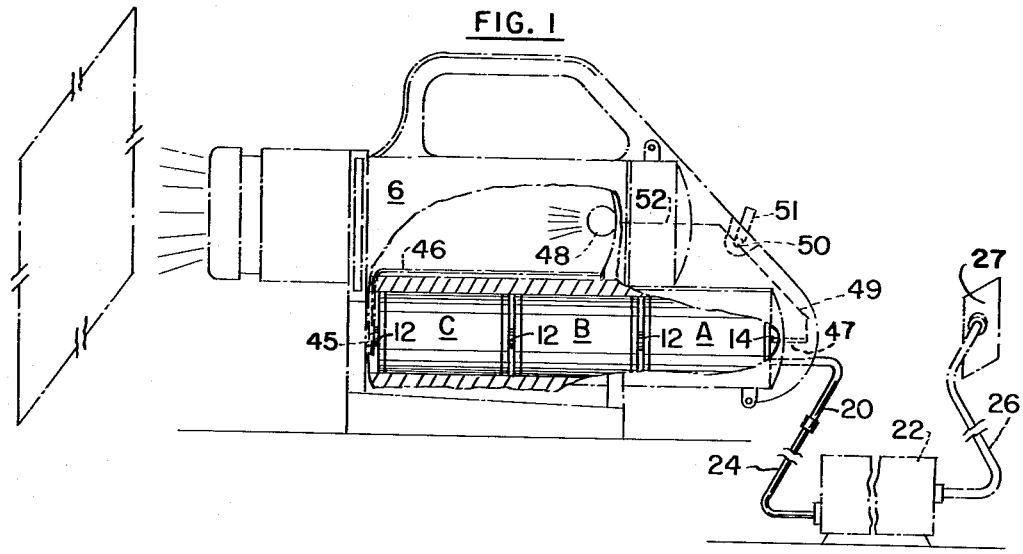
FIGURE 1 is a view in elevation of a slide projector having parts in section to illustrate the electric connector in use.

In operation, as illustrated in FIGURE 1, the projector 6 is operated by three dry batteries. In this illustration the dry batteries generally used in hand flashlights are replaced by dummy batteries B&C, and the electric connector A. In the dummy batteries B&C, the contact points 12 and 14 are connected directly by an electrical conducting element, or wire 13. The electrical connector A is shown in the third space. However, the connector may be placed anywhere in the arrangement which has been described hereinbefore and illustrated in FIGURES 2, 3 and 4. Positioned at one end of the battery space is a terminal 45 adapted to engage contact 12 of the dummy battery C. Connected to the terminal 45 is a wire 46 leading to one terminal of a lamp 48. Positioned at the opposite end of the battery space is a terminal 47 adapted to engage the contact element 14 of the connector A. Leading from the terminal 47 is a wire 49 which leads to a switch 50 operated by the lever 51, and leading from the switch 50 to the other side of the lamp 48 is a wire 52. In this way the lamp may be turned off and on by the same switch which is used when the projector is operated by the dry cells.

The power pack 22 is provided with means (not shown) to control the amount of voltage being furnished the lamp, that is, if the apparatus is operated by three batteries the "power pack" will be set to deliver approximately four and a half volts. Likewise, if the apparatus is operated by one battery, the "power pack" will be set to deliver approximately one and a half volts. These "power packs" may be set to deliver the same voltage the respective number of batteries would furnish to the particular apparatus.

With the present device it is readily seen that no modification of the wiring of the apparatus is necessary to furnish electric current by way of a "power pack" to the apparatus, the "power pack" being designed to operate from ordinary house current. The apparatus is operated in the same manner as if dry batteries were being used, the advantage being that such a device affords a simple and efficient manner for operating an apparatus that normally has been constructed for battery operation. Battery operation of many toys and other apparatus is very expensive when using dry batteries, and further, the electric connector eliminates the inconvenience of rewiring or any change in the apparatus when changing from battery to home current operation.

While a particular form of the invention has been illustrated and described, it is not intended as a limitation as the scope of the invention is best defined in the appended claim.

I claim:

An electric connecting device for replacement for an exhausted dry battery in the battery compartment of a battery operated apparatus whereby rectified and stepped down voltage from house current may be fed through a combination transformer and rectifying unit to operate the apparatus, the invention comprising a tubular connector closed at its opposite ends formed of plastic, centrally located positive and negative contacts in the closed ends of said connector corresponding to the contacts on the exhausted dry battery, electric wires from said combination transformer and rectifying unit extending through the wall of said tubular connector and secured to the respective contacts in said connector, and means connectible between said unit and the source of house current.

References Cited by the Examiner

UNITED STATES PATENTS

| | | | |
|---|---|---|---|
| 1,230,826 | 6/17 | Campbell | 339—19 |
| 2,628,339 | 2/53 | Werner | 320—2 |
| 2,732,534 | 1/56 | Giel | 339—191 X |
| 2,995,695 | 8/61 | Reich | 320—2 |

JOSEPH D. SEERS, *Primary Examiner.*